US011881200B2

(12) United States Patent
Mishima

(10) Patent No.: US 11,881,200 B2
(45) Date of Patent: Jan. 23, 2024

(54) MASK GENERATION DEVICE, MASK GENERATION METHOD, AND RECORDING MEDIUM

(71) Applicant: NEC Corporation, Tokyo (JP)

(72) Inventor: Sakiko Mishima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 148 days.

(21) Appl. No.: 17/638,387

(22) PCT Filed: Sep. 5, 2019

(86) PCT No.: PCT/JP2019/035032
§ 371 (c)(1),
(2) Date: Feb. 25, 2022

(87) PCT Pub. No.: WO2021/044595
PCT Pub. Date: Mar. 11, 2021

(65) Prior Publication Data

US 2022/0301536 A1 Sep. 22, 2022

(51) Int. Cl.
*G10K 11/175* (2006.01)
*G10L 25/18* (2013.01)
*G10L 25/78* (2013.01)

(52) U.S. Cl.
CPC .......... *G10K 11/1754* (2020.05); *G10L 25/18* (2013.01); *G10L 25/78* (2013.01)

(58) Field of Classification Search
CPC ............ G10K 11/1754; G10K 11/1752; G10L 25/78; G10L 25/18
See application file for complete search history.

(56) References Cited

U.S. PATENT DOCUMENTS

| | | | |
|---|---|---|---|
| 2017/0092298 A1 | | 3/2017 | Nakamura et al. |
| 2018/0330759 A1 | | 11/2018 | Funakoshi |

FOREIGN PATENT DOCUMENTS

| | | | | | |
|---|---|---|---|---|---|
| JP | 2627745 B2 | * | 7/1997 | | |
| JP | 2003-131688 A | | 5/2003 | | |
| JP | 2003-223176 A | | 8/2003 | | |
| JP | 2012083746 A | * | 4/2012 | | |
| JP | 2014059483 A | * | 4/2014 | ......... G06K 9/00523 | |
| JP | 2016-156938 A | | 9/2016 | | |
| JP | 2017-067813 A | | 4/2017 | | |
| JP | 2018-189924 A | | 11/2018 | | |
| WO | 2014/027419 A1 | | 2/2014 | | |

OTHER PUBLICATIONS

International Search Report for PCT Application No. PCT/JP2019/035032, dated Dec. 3, 2019.
English translation of Written opinion for PCT Application No. PCT/JP2019/035032, dated Dec. 3, 2019.
Oouchi Yasuhiro et al., "Extraction of sound sources by generalized harmonic analysis—Extraction of musical sound of orchestra-", Acoustical Society of Japan annual meeting papers—I-, Acoustical Society of Japan, Sep. 17, 1997, pp. 579-580.

* cited by examiner

*Primary Examiner* — David L Ton
(74) *Attorney, Agent, or Firm* — Sughrue Mion, PLLC

(57) ABSTRACT

An extraction unit extracts sound pressure information from a spectrogram. A binarization unit carries out binarization on the extracted sound pressure information in order to generate an event mask indicating a time period in which an audio event exists.

8 Claims, 16 Drawing Sheets

MASK GENERATION DEVICE, MASK GENERATION METHOD, AND RECORDING MEDIUM

This application is a National Stage Entry of PCT/JP2019/035032 filed on Sep. 5, 2019, the contents of all of which are incorporated herein by reference, in their entirety.

TECHNICAL FIELD

The present invention relates to a mask generation device, a mask generation method, and a recording medium, and more particularly, to a mask generation device, a mask generation method, and a recording medium that generate an event mask indicating a time period in which an audio event exists.

BACKGROUND ART

There is related art for distinguishing a section in which voice exists and other sections from an audio signal. Such related art is referred to as voice activity detection (VAD).

PTL 1 describes that, after stationary noise is removed from an input audio signal, a section including nonstationary noise (impulse sound) is detected on the basis of a spectrum shape.

PTL 2 describes that a time period in which an audio event exists is specified by executing a masking process, on a spectrogram converted from an audio signal, using an event mask according to event information. The event mask here is a time function that takes a value of one (1.0) in a specific section (here, time period in which audio event exists) and takes a value of zero (0) in other sections (here, time period in which audio event does not exist). By applying this event mask to a spectrogram, intensities (power) of all frequency components of the spectrogram in the section other than the specific section (here, time period in which audio event does not exist) are set to zero (0).

PTL 3 describes that an audio event is detected from each of a plurality of audio signals collected at different places and voice that is commonly included in the plurality of audio signals is extracted on the basis of the detected audio event.

The related art described in PTLs 1 to 3 is used, for example, to distinguish voice from noise and reduce the noise included in the voice.

In addition, the related art is used to improve accuracy of voice recognition.

CITATION LIST

Patent Literature

[PTL 1] WO 2014/027419 A
[PTL 2] JP 2017-067813 A
[PTL 3] JP 2018-189924 A

SUMMARY OF INVENTION

Technical Problem

The related art described in PTLs 1 and 2 should assume a spectrum shape related to a sound (voice or non-voice) to be detected in advance. However, it is not possible for the related art described in PTLs 1 and 2 to detect nonstationary sound as an audio event. Specifically, it is difficult for the related art described in PTLs 1 and 2 to detect non-voice having an unknown spectrum shape as an audio event.

The related art described in PTL 3 uses a temporal waveform of an audio signal in order to determine a sound pressure. Therefore, in a case where the sound to be detected has an unknown spectrum shape having strong power only in some frequencies, it is not possible to obtain a sufficient sound pressure from the audio signal, and as a result, omission of detection of an audio event occurs.

The present invention has been made in consideration of the above problems, and an object of the present invention is to provide an audio signal processing device or the like that can detect a sound of which a shape of a spectrum is unknown as an audio event.

Solution to Problem

A mask generation device according to one aspect of the present invention includes extraction means that extracts sound pressure information from a spectrogram and binarization means that generates an event mask indicating a time period in which an audio event exists by executing a binarization process on the extracted sound pressure information.

A mask generation method according to one aspect of the present invention includes extracting sound pressure information from a spectrogram and generating an event mask indicating a time period in which an audio event exists by executing a binarization process on the extracted sound pressure information.

A non-transitory recording medium according to one aspect of the present invention storing a program for causing a computer to execute extracting sound pressure information from a spectrogram and generating an event mask indicating a time period in which an audio event exists by executing a binarization process on the extracted sound pressure information.

Advantageous Effects of Invention

According to one aspect of the present invention, a sound of which a shape of a spectrum is unknown can be detected as an audio event.

EXAMPLE EMBODIMENT

First Example Embodiment

A first example embodiment will be described below with reference to FIGS. 1 to 8.

(Mask Generation Device 120)

Figure 1:
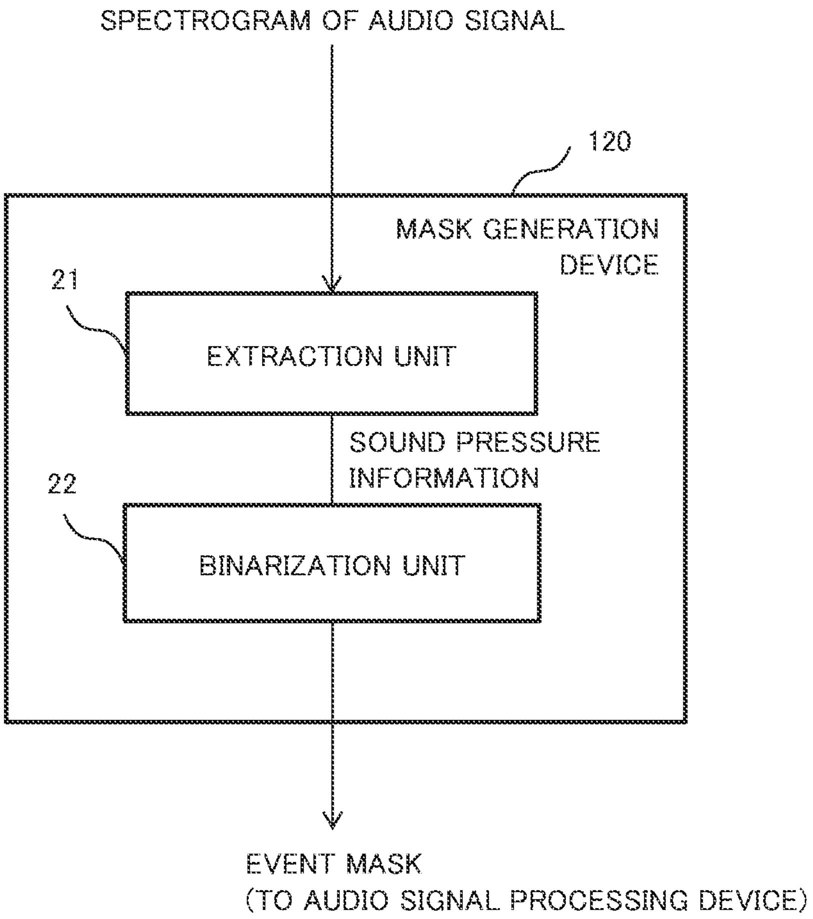
FIG. 1 is a block diagram illustrating a configuration of a mask generation device according to a first example embodiment.

A mask generation device 120 according to the present first example embodiment will be described with reference to FIG. 1. FIG. 1 is a block diagram illustrating a configuration of the mask generation device 120. As illustrated in FIG. 1, the mask generation device 120 includes an extraction unit 21 and a binarization unit 22.

The extraction unit 21 extracts sound pressure information from a spectrogram. The extraction unit is an example of extraction means. The sound pressure information may be, for example, an intensity (power), expressed by unit of pascals or decibels, measured for an audio signal or may be a sound pressure level based on the intensity (power). For example, the extraction unit 21 receives a spectrogram converted from an audio signal collected by one or more microphones. Alternatively, the extraction unit 21 may convert data of an audio signal that has been recorded in advance into a spectrogram.

Then, the extraction unit 21 sets a time series of maximum values (referred to as maximum value series) of an intensity (power) in an entire band of a frequency included in the spectrogram as the sound pressure information. Alternatively, the extraction unit 21 sets a time series of average values (referred to as average value series) of the intensity (power) in the entire band of the frequency included in the spectrogram as the sound pressure information. Alternatively, the extraction unit 21 may set both of the average value series and the maximum value series as the sound pressure information.

Figure 4:
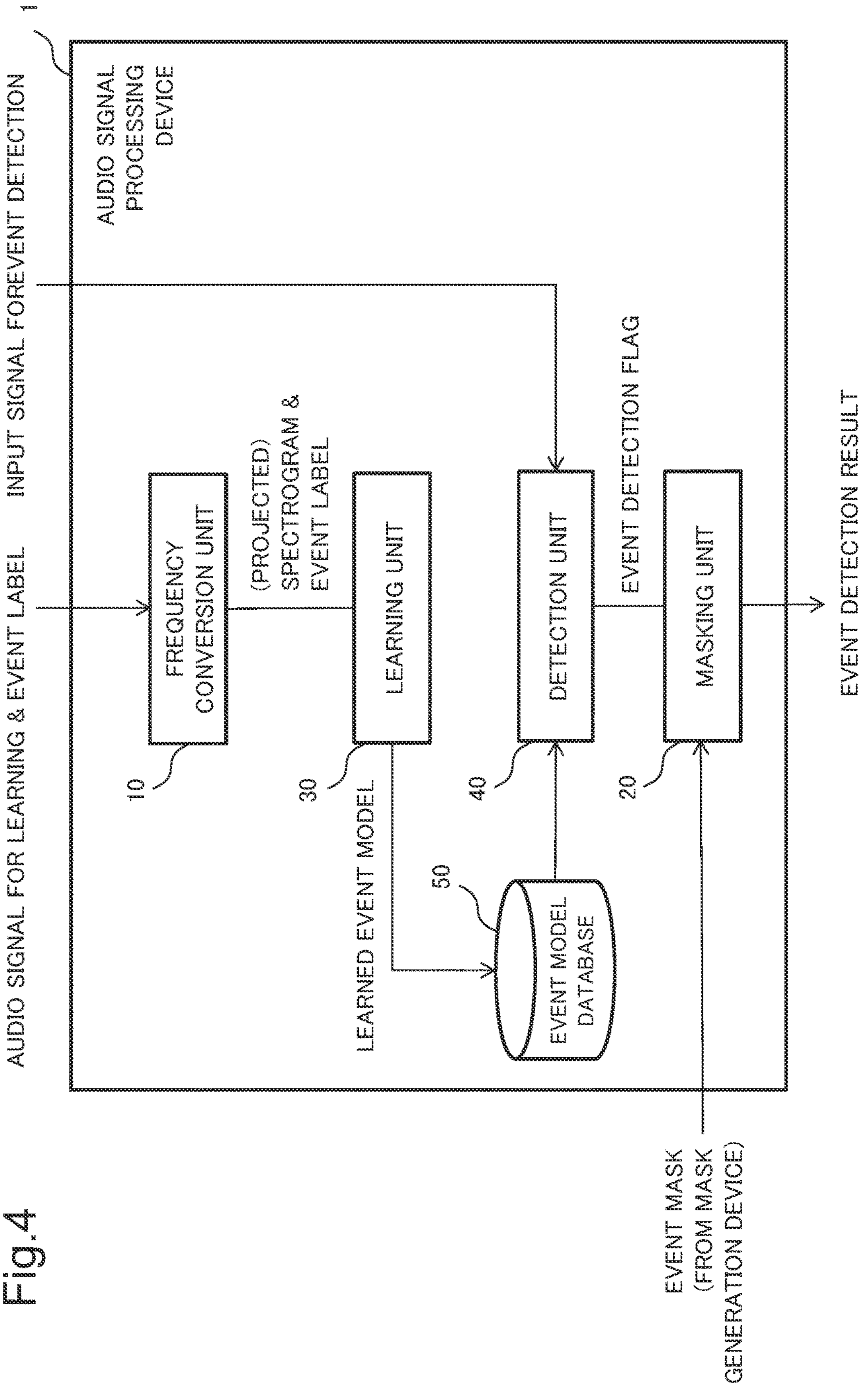
FIG. 4 is a block diagram illustrating a configuration of an audio signal processing device according to the first example embodiment.

The binarization unit 22 generates an event mask that indicates a time period in which an audio event exists by executing a binarization process on the extracted sound pressure information. The binarization unit 22 is an example of binarization means. Specifically, the binarization unit 22 binarizes the intensity or the sound pressure level included in the sound pressure information into one (1.0) or zero (0) according to whether to exceed a predetermined threshold. The binarization unit 22 transmits the generated event mask to a masking unit 20 of the audio signal processing device 1 to be described later (FIG. 4).

The event mask is used to distinguish a section (specifically, time period) in which an audio event to be detected exists and other sections (specifically, time period in which only noise exists or time period with no sound) in the spectrogram. The audio event is an audio signal observed in association with generation of a sound (voice or non-voice) to be detected. The audio event to be detected may be voice (for example, human voice) or may be non-voice (for example, operation sound of machine).

Figure 2:
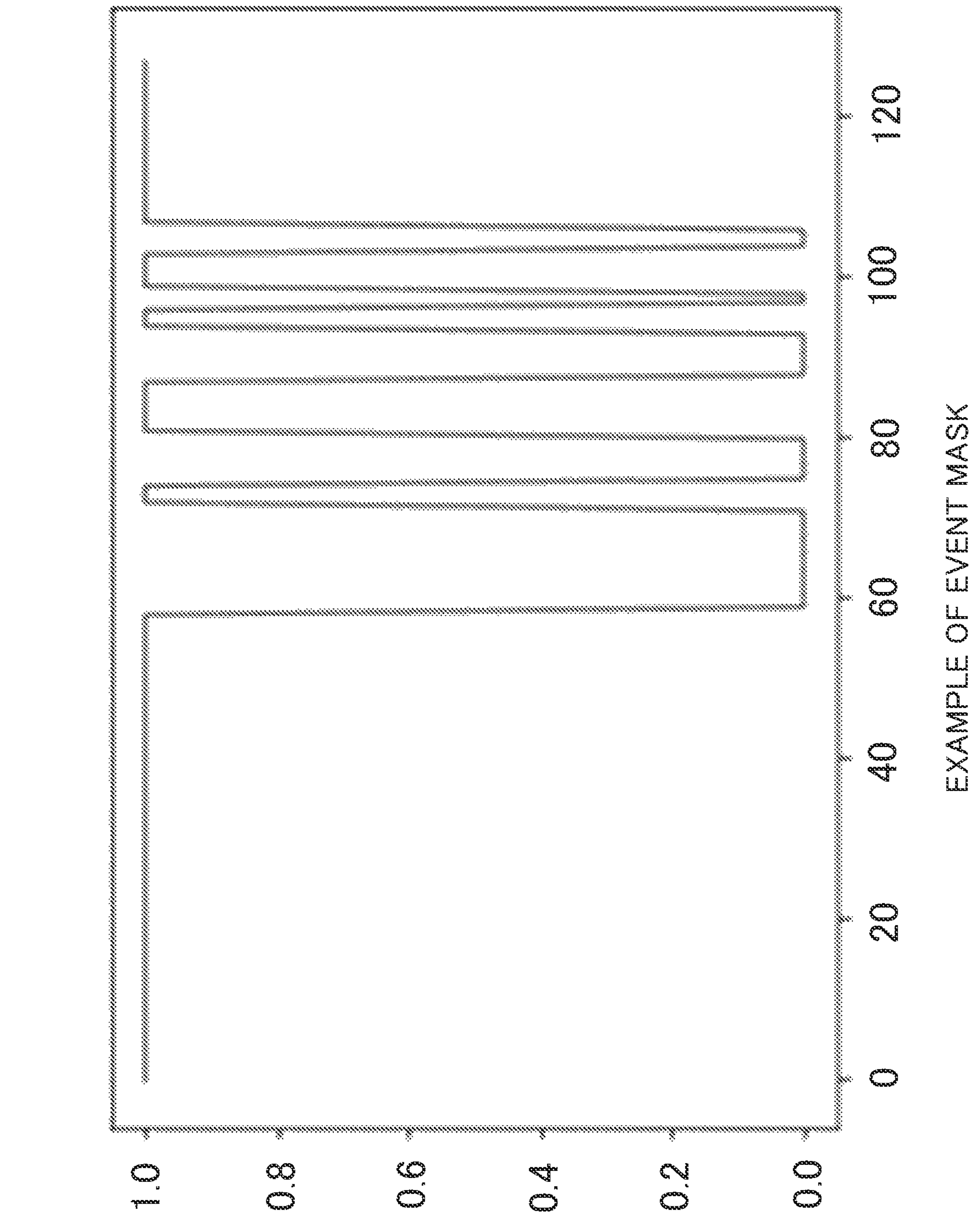
FIG. 2 is a diagram illustrating an example of an event mask generated by the mask generation device according to the first example embodiment.

FIG. 2 is a diagram illustrating an example of the event mask generated by the mask generation device 120. The event mask illustrated in FIG. 2 is generated from the sound pressure information binarized by the binarization unit 22. In the event mask illustrated in FIG. 2, the horizontal axis indicates a time, and the vertical axis indicates a binarized intensity or sound pressure level (here, value of one (1.0) or zero (0)). The event mask takes the value of one (1.0) in the section in which the audio event to be detected exists, and takes the value of zero (0) in the section in which the audio event to be detected does not exist.

In the present first example embodiment, the event mask is used for a masking process on spectrogram performed by the audio signal processing device 1 to be described later. In the masking process according to the present first example embodiment, the event mask illustrated in FIG. 2 is multiplied with respect to the spectrogram. As a result, all frequency components in the spectrogram in the section in which the audio event to be detected does not exist are set to zero (0). Therefore, sounds that do not relate to the audio event to be detected, such as noise, can be removed from the spectrogram. Only a sound that is the audio event to be detected remains in the spectrogram on which the masking process has been executed.

Hereinafter, both of voice and non-voice to be detected are referred to as a sound to be detected. The sound to be detected may be stationary or non-stationary. As described above, the sound to be detected may be voice or non-voice.

(Mask Generation Process)

Figure 3:
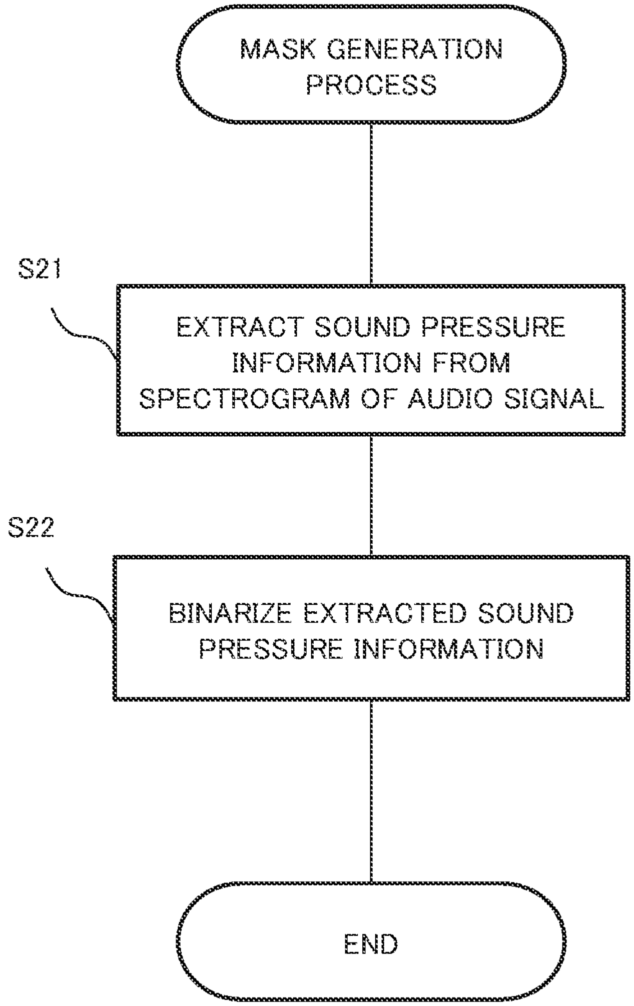
FIG. 3 is a flowchart illustrating a flow of a mask generation process executed by the mask generation device according to the first example embodiment.

An operation of the mask generation device 120 according to the present first example embodiment will be described with reference to FIG. 3. FIG. 3 is a flowchart illustrating a flow of a mask generation process executed by each unit of the mask generation device 120.

As illustrated in FIG. 3, the extraction unit 21 extracts sound pressure information from a spectrogram (S21). The extraction unit 21 transmits the extracted sound pressure information to the binarization unit 22.

The binarization unit 22 receives the sound pressure information from the extraction unit 21. The binarization unit 22 executes a binarization process on the extracted sound pressure information (S22). As a result, the binarization unit 22 generates an event mask that indicates a time period in which an audio event exists. Specifically, the event mask is a time function that takes a value of one (1.0) in a time period in which the audio event exists and takes a value of zero (0) in a time period in which the audio event does not exist.

The binarization unit 22 transmits the generated event mask to the masking unit 20 of the audio signal processing device 1 to be described later (FIG. 4). Thus, the operation of the mask generation device 120 ends.

(Audio Signal Processing Device 1)

The audio signal processing device 1 according to the present first example embodiment will be described with reference to FIG. 4. FIG. 4 is a block diagram illustrating a configuration of the audio signal processing device 1. As illustrated in FIG. 4, the audio signal processing device 1 includes a frequency conversion unit 10, the masking unit 20, a learning unit 30, a detection unit 40, and an event model database 50.

The frequency conversion unit 10 receives an audio signal and an event label. The event label is an identifier of an audio event.

Figure 5:
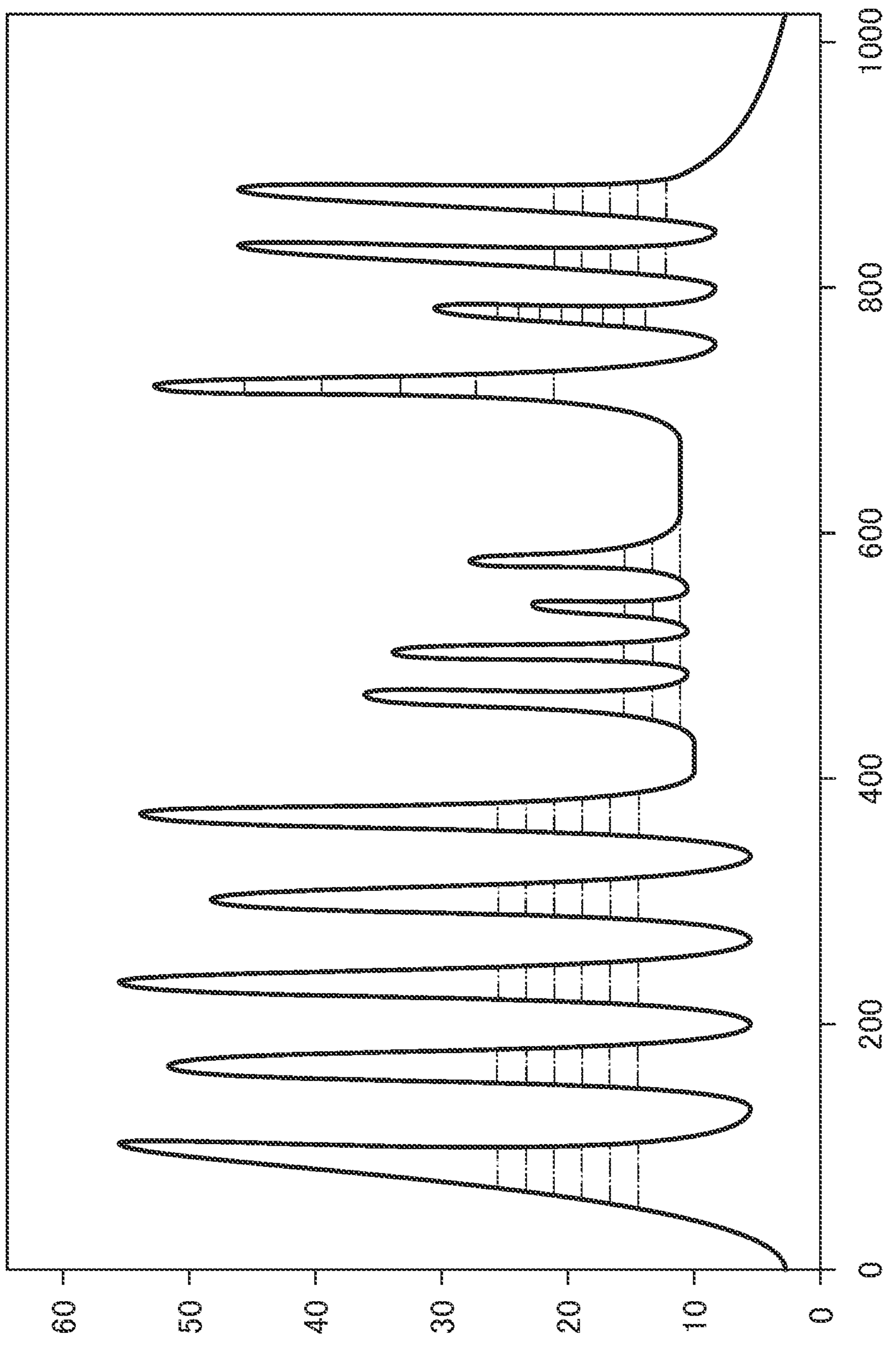
FIG. 5 is a diagram illustrating an example of a spectrogram generated by a frequency conversion unit of the audio signal processing device according to the first example embodiment.
Figure 6:
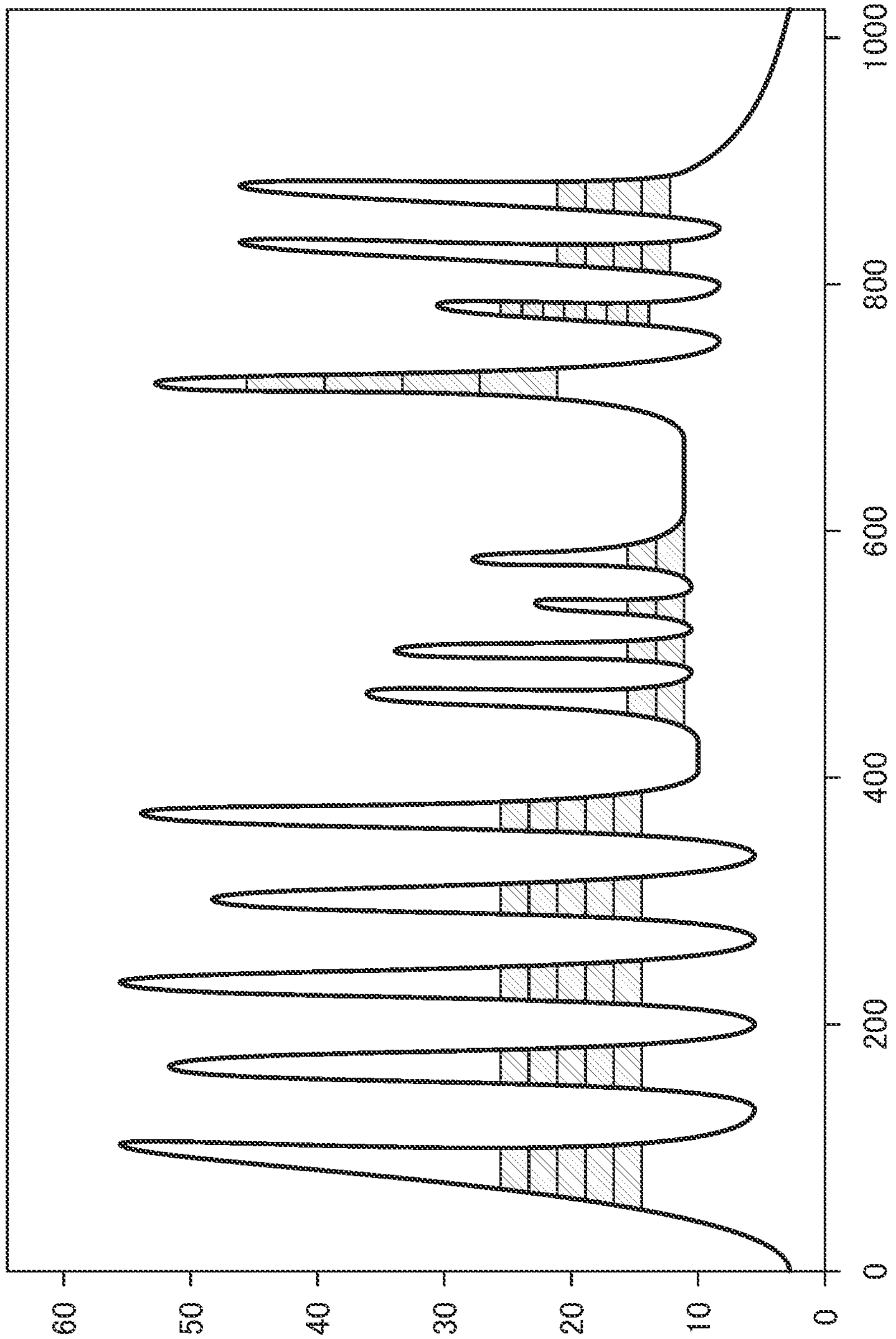
FIG. 6 is a diagram illustrating an example of a spectrogram projected using a nonlinear function.

The frequency conversion unit 10 converts the received audio signal into a frequency-domain signal. The frequency conversion here is to convert the audio signal into an expression indicating a temporal change in a frequency component of the audio signal. That is, the frequency conversion unit 10 generates a spectrogram that indicates a temporal change in an intensity (power) for each frequency component by converting the audio signal into the frequency-domain signal. In FIG. 5, a dashed line schematically expresses a color density. In FIG. 6, a solid line or hatching schematically expresses a color darker than the color expressed by the dashed line in FIG. 5.

FIG. 5 is a graph illustrating an example of the spectrogram generated by the frequency conversion unit 10. The horizontal axis of the graph illustrated in FIG. 5 indicates a time, and the vertical axis indicates a frequency. The intensity (power) of the audio signal is associated to darkness of a color. In FIG. 5, a magnitude of the intensity (power) of the audio signal is expressed by a density of the dashed lines. However, in the spectrogram illustrated in FIG. 5, in a domain where the intensity (power) is weak, illustration of the dashed line is omitted.

Furthermore, the frequency conversion unit 10 projects the spectrogram using a nonlinear function (for example, sigmoid function). Specifically, the frequency conversion unit 10 inputs the intensity of the audio signal for each frequency into a nonlinear function as an independent variable x, and acquires an intensity f (x) converted by a nonlinear function f. Although a strong intensity becomes further stronger through the conversion using the nonlinear function, a weak intensity does not become so strong. As a result, in the projected spectrogram, the magnitude of the intensity of the audio signal for each frequency is more emphasized than the original spectrogram.

FIG. 6 is a graph illustrating an example of the spectrogram projected using the sigmoid function. However, in the spectrogram illustrated in FIG. 6, in a domain where the intensity (power) is weak, illustration of the solid line and hatching is omitted. When the graph illustrated in FIG. 6 is compared with the graph illustrated in FIG. 5, a color of a domain where the intensity of the audio signal is high is darker in the graph illustrated in FIG. 6. That is, in the projected spectrogram illustrated in FIG. 6, a domain where the intensity of the audio signal is higher (hatched portion) than the spectrogram illustrated in FIG. 5 is emphasized. Hereinafter, the projected spectrogram may be simply referred to as a spectrogram.

The frequency conversion unit 10 transmits the (projected) spectrogram to the learning unit 30 together with the event label received together with the audio signal.

The learning unit 30 receives the event label and the spectrogram from the frequency conversion unit 10. The learning unit 30 extracts an acoustic feature from the spectrogram. For example, the learning unit 30 extracts the acoustic feature such as mel-frequency cepstrum coefficients (MFCC) or a spectrum envelope from the spectrogram.

The learning unit 30 makes an event model learn the acoustic features extracted from a large number of spectrograms. In this way, when the detection unit 40 to be described later inputs a single input signal, which has been input to the audio signal processing device 1, to the learned event model, the learned event model can output a correct detection result of the audio event. The event model is, for example, a neural network.

The input signal described above used to detect an audio event is a time-series spectrum. For example, the input signal is a spectrogram in which spectrums (power spectrum) obtained by converting the audio signal into the frequency-domain signal are arranged in time series. Alternatively, the input signal may be an acoustic feature of another frequency domain other than the spectrogram. As a method for converting the audio signal into the acoustic feature of the another frequency domain, fast Fourier transform (FFT), constant-Q transformation (CQT), wavelet transform, or the like can be used. The acoustic feature of the frequency domain here is time-series physical parameters in one or a plurality of frequency bands obtained by converting the audio signal into the frequency-domain signal. For example, as the acoustic feature of the frequency domain, a mel-frequency spectrogram and a CQT spectrum (also referred to as logarithmic frequency spectrogram) can be exemplified, in addition to the spectrogram described above.

Alternatively, the learning unit 30 may acquire a temporal waveform of an audio signal from a microphone or the like (not illustrated) and use, as an input signal, a spectrogram obtained by converting the acquired temporal waveform in a certain period into the frequency domain signal.

After learning of the event model is completed, the learning unit 30 stores the learned event model associated with the event label in the event model database 50 in association with the event label.

The detection unit 40 receives an input signal for audio event detection. The detection unit 40 detects the audio event from the input signal using the learned event model stored in the event model database 50.

More specifically, the detection unit 40 inputs the input signal into the learned event model and receives a detection result of the audio event output from the learned event model. The detection result of the audio event includes at least information indicating the detected audio event (including information indicating type of audio event) and information indicating a time period in which the audio event exists. The detection unit 40 outputs the information indicating the detected audio event and the information indicating the time period in which the audio event exists to the masking unit 20 as event detection flags.

The masking unit 20 receives the event detection flag from the detection unit 40. The masking unit 20 receives an event mask according to the audio event to be detected from the mask generation device 120. As described in the first example embodiment, the event mask is the time function that takes the value of one (1.0) in the time period in which the audio event exists, and takes the value of zero (0) in the time period in which the audio event does not exist.

The masking unit 20 determines whether the detection result of the audio event is correct using the received event mask. In an example, the masking unit 20 applies the event mask to the time function that takes the value of one (1.0) only in the time period in which the audio event is detected and takes the value of zero (0) in other time periods.

In a case where the event mask takes the value of one (1.0) in the time period in which the audio event is detected, the masking unit 20 outputs the value of one (1.0). In this case, the masking unit 20 determines that the detection result of the audio event is correct and outputs the detection result of the audio event. In a case where the event mask takes the value of one (1.0) in the time period in which the audio event is detected, the masking unit 20 outputs the value of zero (0). In this case, the masking unit 20 determines that the detection result of the audio event is wrong and does not output the detection result of the audio event. In other words, in the present first example embodiment, the masking unit 20 performs masking on the detection result of the audio event using the event mask.

(Model Learning Process)

Figure 7:
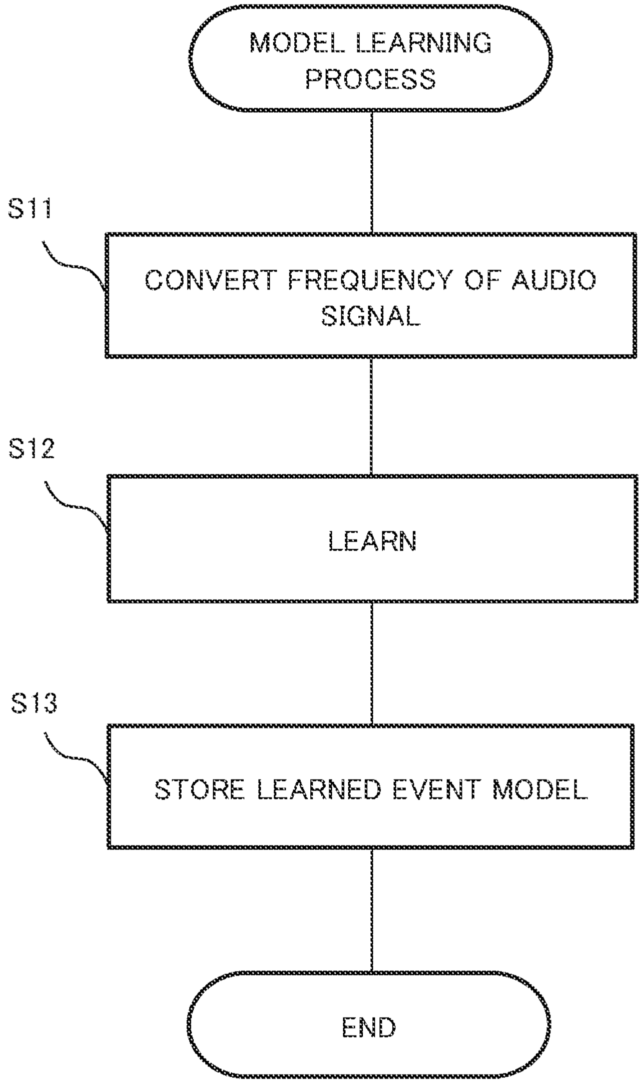
FIG. 7 is a flowchart illustrating a flow of an operation of the audio signal processing device according to the first example embodiment.

An operation of the audio signal processing device 1 according to the present first example embodiment will be described with reference to FIG. 7. FIG. 7 is a sequence diagram illustrating a flow of a process executed by each unit of the audio signal processing device 1.

As illustrated in FIG. 7, first, the frequency conversion unit 10 of the audio signal processing device 1 receives an audio signal and an event label. The audio signal and the event label are associated with each other by an identifier. The frequency conversion unit 10 converts the received audio signal into the frequency domain signal. Moreover, the frequency conversion unit 10 projects a spectrogram by a nonlinear function so as to emphasize a domain in which power is strong in the generated spectrogram (S11).

Thereafter, the frequency conversion unit 10 transmits the (projected) spectrogram to the learning unit 30 together with the event label.

The learning unit 30 receives the spectrogram and the event label from the frequency conversion unit 10. The learning unit 30 makes an event model (for example, neural network) perform learning using the received spectrogram (S12).

Thereafter, the learning unit 30 stores the learned event model in the event model database 50 in association with the event label (S13).

Thus, the operation of the audio signal processing device 1 ends.

(Event Detection Process)

Figure 8:
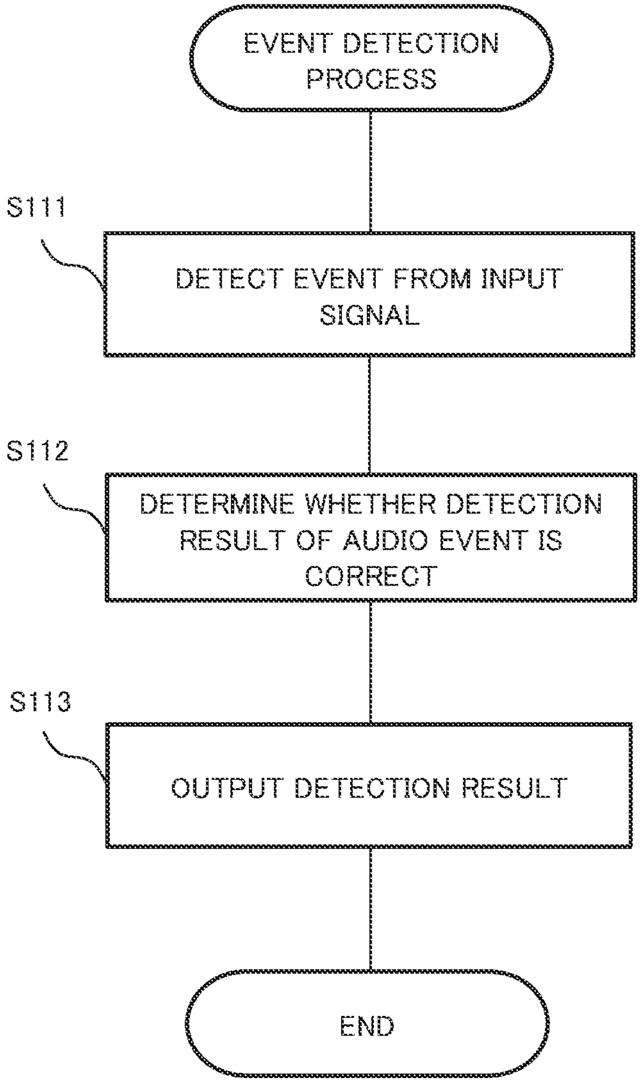
FIG. 8 is a flowchart illustrating a flow of another operation of the audio signal processing device according to the first example embodiment.

Another operation of the audio signal processing device 1 according to the present first example embodiment will be described with reference to FIG. 8. FIG. 8 is a flowchart illustrating a flow of an event detection process executed by each unit of the audio signal processing device 1.

As illustrated in FIG. 8, first, the detection unit 40 of the audio signal processing device 1 receives an input signal for event detection. The detection unit 40 detects the audio event from the input signal using the learned event model stored in the event model database 50 (S111).

For example, the input signal is a spectrogram in which spectrums obtained by converting an audio signal into an acoustic feature in a frequency domain are arranged in time series. The detection unit 40 inputs the input signal into the learned event model and receives a detection result of the audio event output from the learned event model. The detection unit 40 outputs the information indicating the detected audio event and the information indicating the time period in which the audio event exists to the masking unit 20 as event detection flags.

The masking unit 20 receives the event detection flag from the detection unit 40. The masking unit 20 receives the event mask used to detect the audio event to be detected from the binarization unit 22 of the mask generation device 120 (FIG. 1). The masking unit 20 determines whether the detection result of the audio event is correct using the received event mask (S112).

Only in a case where the time period in which the audio event is detected is included in the section having the value of one (1.0) in the event mask, the masking unit 20 outputs the detection result of the audio event (S113).

Thus, the operation of the audio signal processing device 1 ends.

Effects of Present Example Embodiment

According to the configuration of the present example embodiment, the extraction unit 21 of the mask generation device 120 extracts the sound pressure information from the spectrogram. The binarization unit 22 generates an event mask that indicates a time period in which an audio event exists by executing a binarization process on the extracted sound pressure information. Even in a case where a spectrum shape is unknown, the audio event can be detected by using the event mask generated in this way.

According to the configuration of the present example embodiment, by applying the event mask to the detection result of the audio event output from the learned event model, the detection result of the audio event that has been erroneously detected in a noise portion in which a sound pressure is weak is removed. Therefore, erroneous detection of the audio event can be prevented.

Second Example Embodiment

A second example embodiment will be described with reference to FIGS. 9 to 14.

(Mask Generation Device 220)

Figure 9:
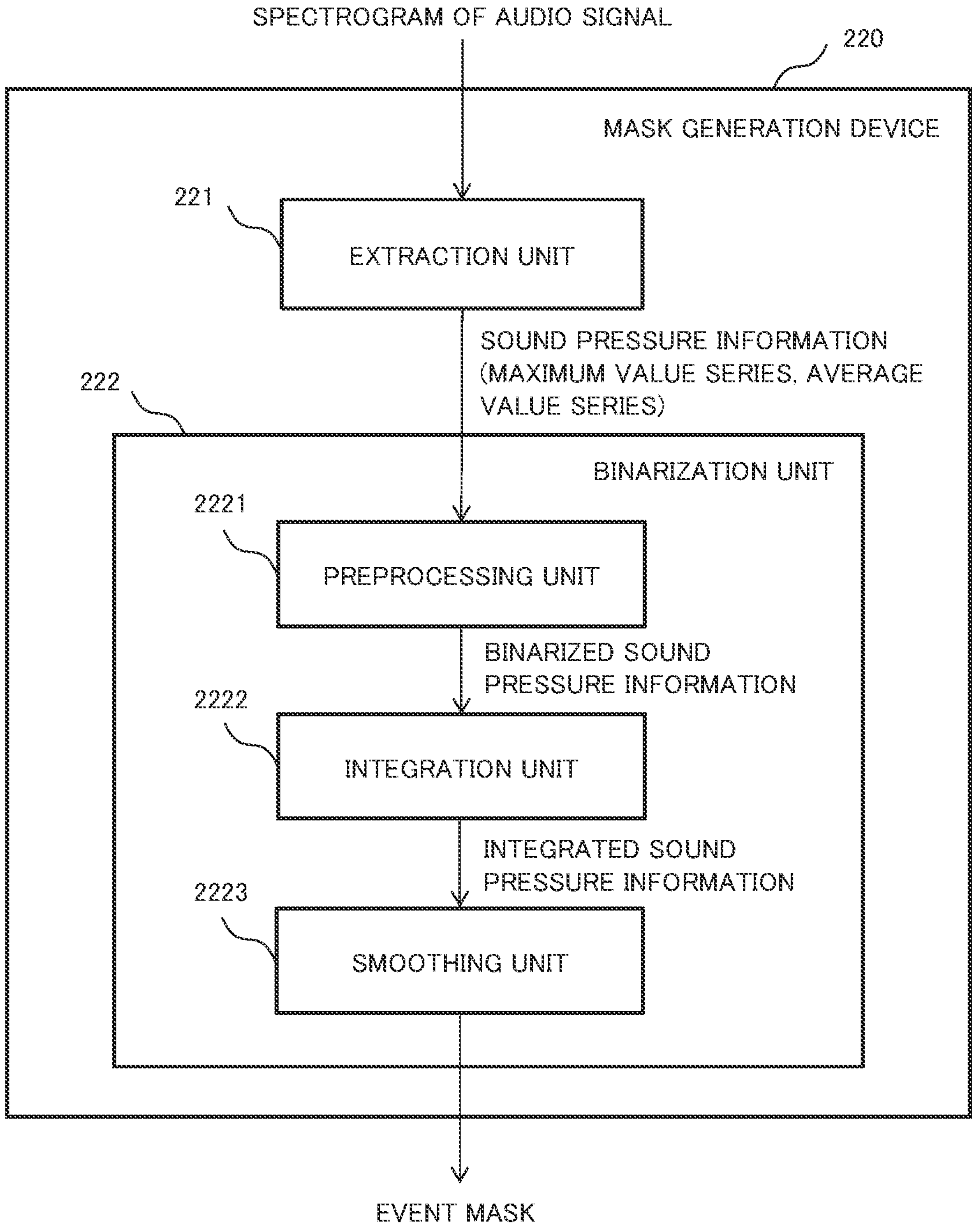
FIG. 9 is a block diagram illustrating a configuration of a mask generation device according to a second example embodiment.

FIG. 9 is a block diagram illustrating a configuration of a mask generation device 220 according to the present second example embodiment. As illustrated in FIG. 9, the mask generation device 220 includes an extraction unit 221 and a binarization unit 222. Here, the binarization unit 222 includes a preprocessing unit 2221, an integration unit 2222, and a smoothing unit 2223.

The extraction unit 221 extracts sound pressure information from a spectrogram. The extraction unit is an example of extraction means. For example, the extraction unit 221 receives an audio signal collected by one or more microphones. Alternatively, the extraction unit 221 may generate a spectrogram by converting data of an audio signal that has been recorded in advance into the frequency domain signal. The extraction unit 221 transmits the extracted sound pressure information to the binarization unit 222.

The binarization unit 222 generates an event mask that indicates a time period in which an audio event exists by executing a binarization process on the extracted sound pressure information. The binarization unit 222 is an example of binarization means. The binarization unit 222 transmits the generated event mask to the learning unit 30 of the audio signal processing device 1 described in the first example embodiment (FIG. 4).

(Mask Generation Process)

Figure 10:
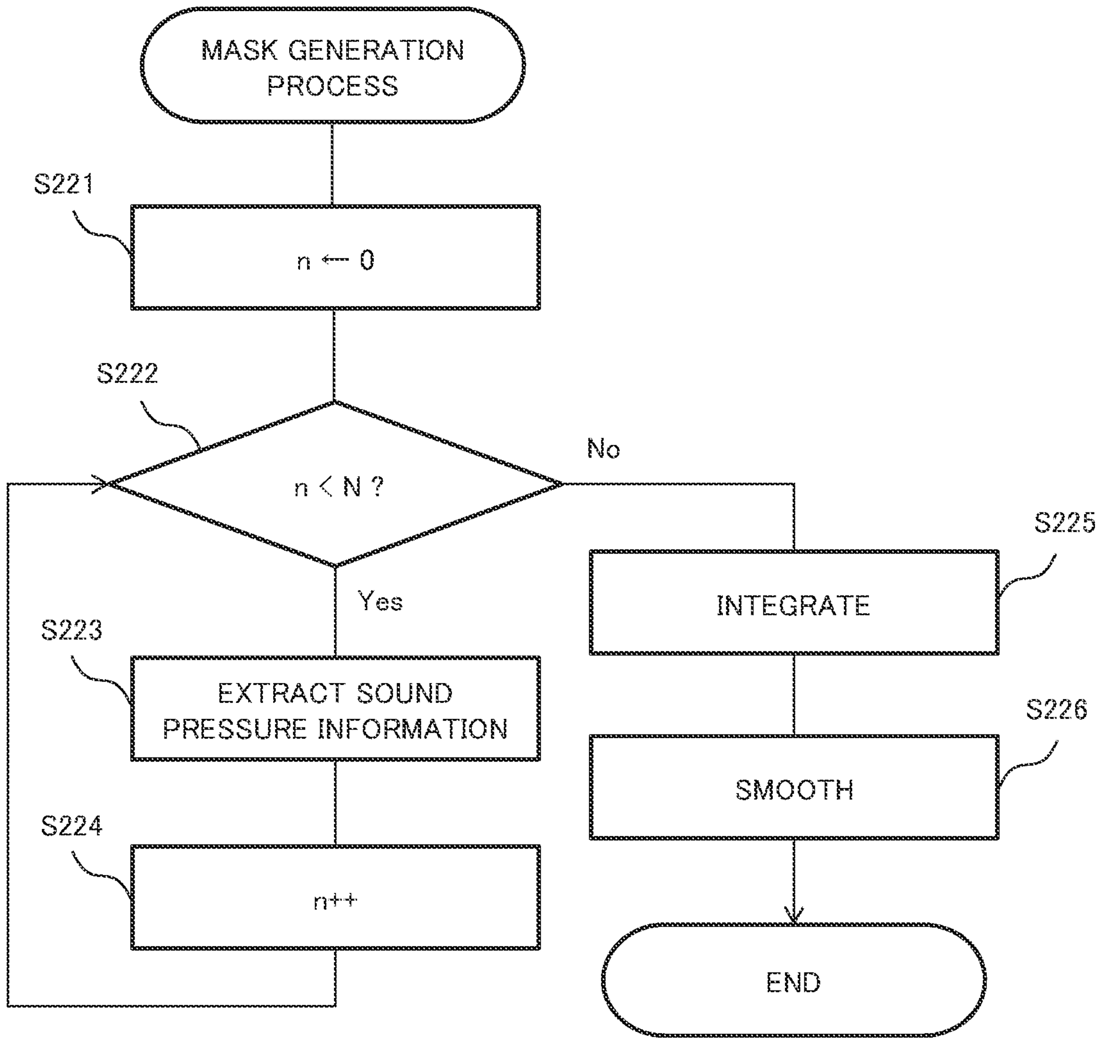
FIG. 10 is a flowchart illustrating a flow of an operation of the mask generation device according to the second example embodiment.
Figure 11:
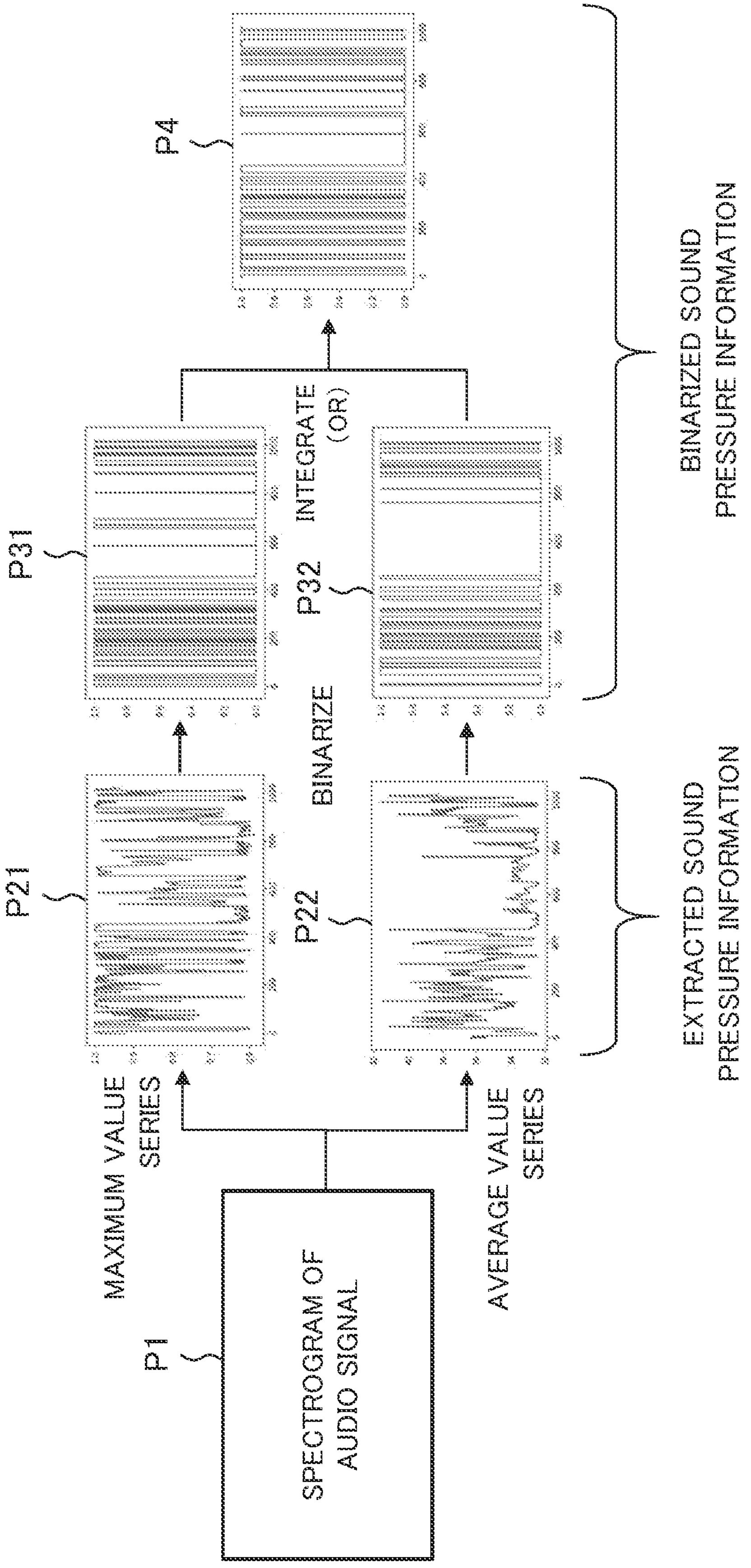
FIG. 11 is a diagram illustrating a series of flows for generating an event mask from a spectrogram.

An operation of the binarization unit 222 will be described with reference to FIGS. 10 and 11. FIG. 10 is a flowchart illustrating a flow of a process executed by each unit of the binarization unit 222. FIG. 11 is a diagram illustrating a series of flows for generating an event mask from a spectrogram. In FIG. 11, continuous numbers (0, 1) that are integers equal to or more than zero (0) are assigned to sound pressure information P1 and P2 in advance.

As illustrated in FIG. 10, at the beginning of the flow, zero (0) is substituted for a variable n (S221). The variable n is associated to the number of the sound pressure information extracted by the extraction unit 221.

In a case where the variable n is smaller than N (Yes in S222), the flow proceeds to step S223. In a case where the variable n is equal to or more than N (No in S222), the flow proceeds to step S225. N (>1) is associated to the total number of pieces of sound pressure information.

The extraction unit 221 extracts a single piece of sound pressure information associated to a number n from the spectrogram (S223). In the example illustrated in FIG. 11, the extraction unit 221 extracts one of the two pieces of sound pressure information P21 and P22 associated to the number n from the spectrogram.

The two pieces of sound pressure information P21 and P22 are respectively a maximum value series and an average value series of the spectrogram. The maximum value series is a time series of maximum values of an intensity (power) included in the spectrogram. The average value series is a time series of average values of the intensity (power) included in the spectrogram.

In FIG. 11, the horizontal axis of each graph illustrating each of the pieces of sound pressure information P21 and P22 indicates a time, and the vertical axis indicates an intensity (power).

The sound pressure information of the maximum value series is effective for detecting an audio event of which a sound pressure is high in a narrow band such as a impulse sound, and the sound pressure information of the average value series is effective for detecting an audio event of which the sound pressure is high in a wide band. Alternatively, the extraction unit 221 may extract three or more pieces of sound pressure information including at least the maximum value series and the average value series from the spectrogram.

The extraction unit 221 transmits sound pressure information to which a number associated to the number n is assigned to the preprocessing unit 2221 of the binarization unit 222.

The preprocessing unit 2221 binarizes the sound pressure information received from the extraction unit 221. Specifically, the preprocessing unit 2221 converts power equal to or more than a threshold into a value of one (1.0) and power below the threshold into zero (0) in the sound pressure information associated to the number n. The threshold is determined to be, for example, 1/m (m>1) of a value obtained by integrating power of an audio signal in a frequency range from zero (0) to infinity (or predetermined finite value).

In the example illustrated in FIG. 11, two pieces of binarized sound pressure information P31 and P32 are illustrated. The two pieces of sound pressure information P31 and P32 are obtained by respectively binarizing the pieces of sound pressure information P21 and P22.

Thereafter, variable n is increased by 1 (S224), and the flow returns to step S222. While the variable n is smaller than N, the processes from step S222 to step S224 described above are repeated. When the variable n is equal to or more than N (No in S222), the preprocessing unit 2221 transmits N pieces of binarized sound pressure information to the integration unit 2222. Then, the flow proceeds to step S225.

The integration unit 2222 receives the N pieces of binarized sound pressure information from the preprocessing unit 2221. The integration unit 2222 integrates the N pieces of binarized sound pressure information (S225).

Specifically, if at least one value of the N pieces of binarized sound pressure information is one (1.0) at a certain time, the integration unit 2222 sets a value of the integrated sound pressure information at the time to one (1.0), and if all the values are zero (0), the integration unit 2222 sets the value of the integrated sound pressure information at the time to zero (0).

In this way, the integration unit 2222 generates one piece of integrated sound pressure information on the basis of the values of the N pieces of binarized sound pressure information (1.0 or 0) at the same time. In the example illustrated in FIG. 11, by integrating the two pieces of binarized sound pressure information P31 and P32, a single piece of sound pressure information P4 is generated. The integration unit 2222 transmits the integrated sound pressure information to the smoothing unit 2223.

The smoothing unit 2223 receives the integrated sound pressure information from the integration unit 2222. The smoothing unit 2223 smooths the integrated sound pressure information (S226). Specifically, the smoothing unit 2223 divides the sound pressure information for each predetermined range of a time period. In a case where a ratio of the value one (1.0) (or ratio between value one (1.0) and value zero (0)) is equal to or more than a certain value in one range of the time period, the smoothing unit 2223 sets all the intensities (power) or sound pressure levels in the range of the time period are set to 1.0. Conversely, in a case where the ratio of the value one (1.0) (or ratio between value one (1.0) and value zero (0)) is not equal to or more than the certain value in the predetermined range of the time period, the smoothing unit 2223 sets all the intensities (power) or sound pressure levels in the range of the time period to zero (0).

The smoothing unit 2223 outputs the sound pressure information smoothed in this way to the masking unit 20 of the audio signal processing device 1 (FIG. 4) as an event mask. Thus, the mask generation process ends.

Effects of Present Example Embodiment

According to the configuration of the present example embodiment, the extraction unit 221 extracts the plurality of pieces of sound pressure information from the spectrogram. By using the plurality of pieces of sound pressure information, an effect for preventing omission of the detection of the audio event can be expected. The binarization unit 222 generates an event mask that indicates a time period in which an audio event exists by executing a binarization process on the extracted sound pressure information.

As described in the first example embodiment, in the audio signal processing device 1, by applying the event mask to the detection result of the audio event output from the learned event model, the detection result of the audio event that has been erroneously detected is removed. Therefore, erroneous detection of the audio event can be prevented.

Third Example Embodiment

Figure 12:
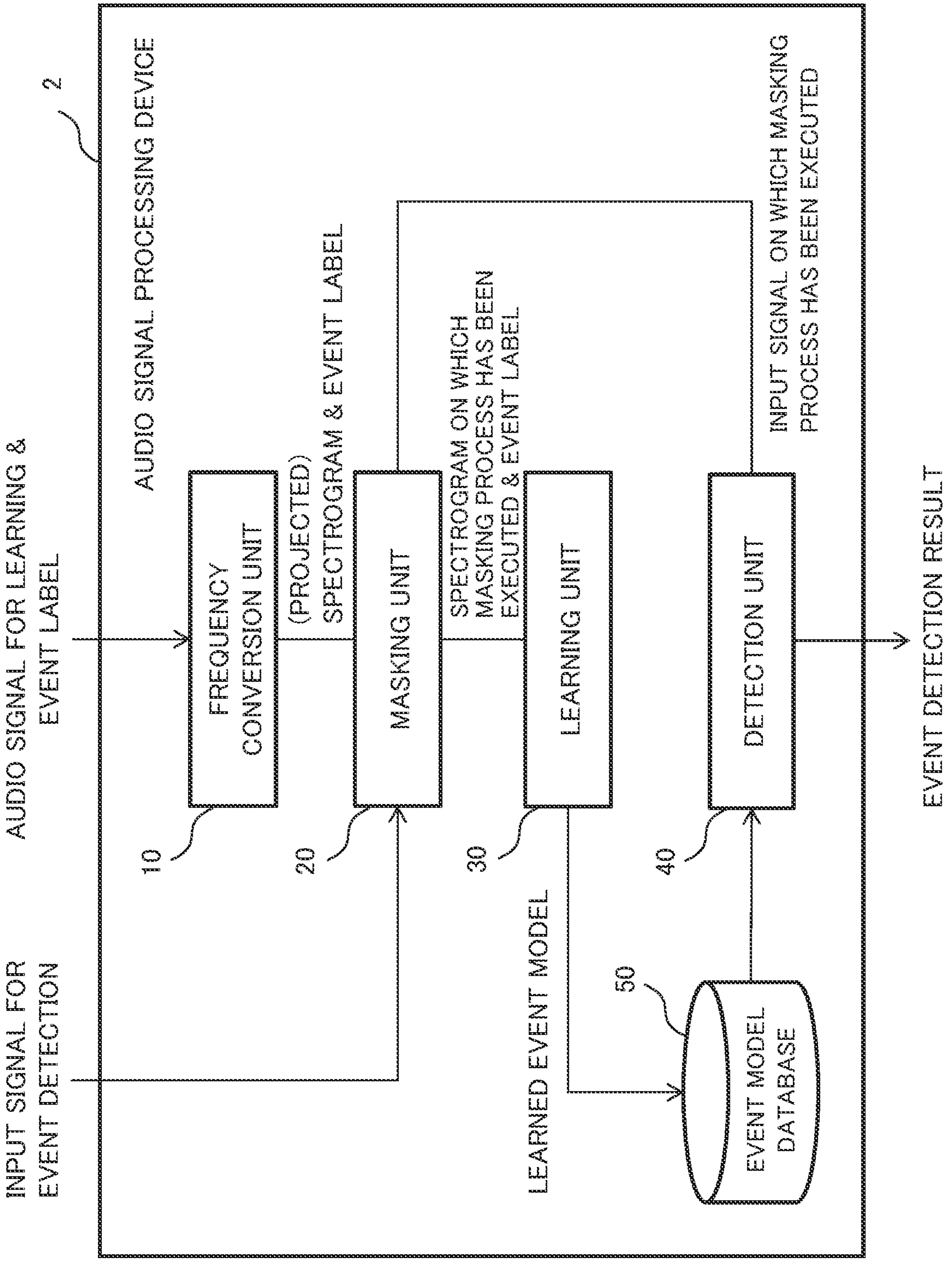
FIG. 12 is a block diagram illustrating a configuration of an audio signal processing device according to a third example embodiment.

A third example embodiment will be described with reference to FIGS. 12 to 14.

(Audio Signal Processing Device 2)

An audio signal processing device 2 according to the present third example embodiment will be described with reference to FIG. 12. FIG. 12 is a block diagram illustrating a configuration of the audio signal processing device 2. As illustrated in FIG. 12, the audio signal processing device 2 includes a frequency conversion unit 10, a masking unit 20, a learning unit 30, a detection unit 40, and an event model database 50.

The configuration of the audio signal processing device 2 according to the present third example embodiment is the same as the configuration of the audio signal processing device 1 according to the first example embodiment. However, in the present third example embodiment, a part of an operation of the audio signal processing device 2 is different from the audio signal processing device 2. As described in detail below, in the present third example embodiment, a masking process is executed on a spectrogram converted from an audio signal before learning of an event model.

(Model Learning Process)

The operation of the audio signal processing device 2 according to the present third example embodiment will be described with reference to FIG. 13. FIG. 13 is a flowchart illustrating a flow of a process executed by each unit of the audio signal processing device 2.

Figure 13:
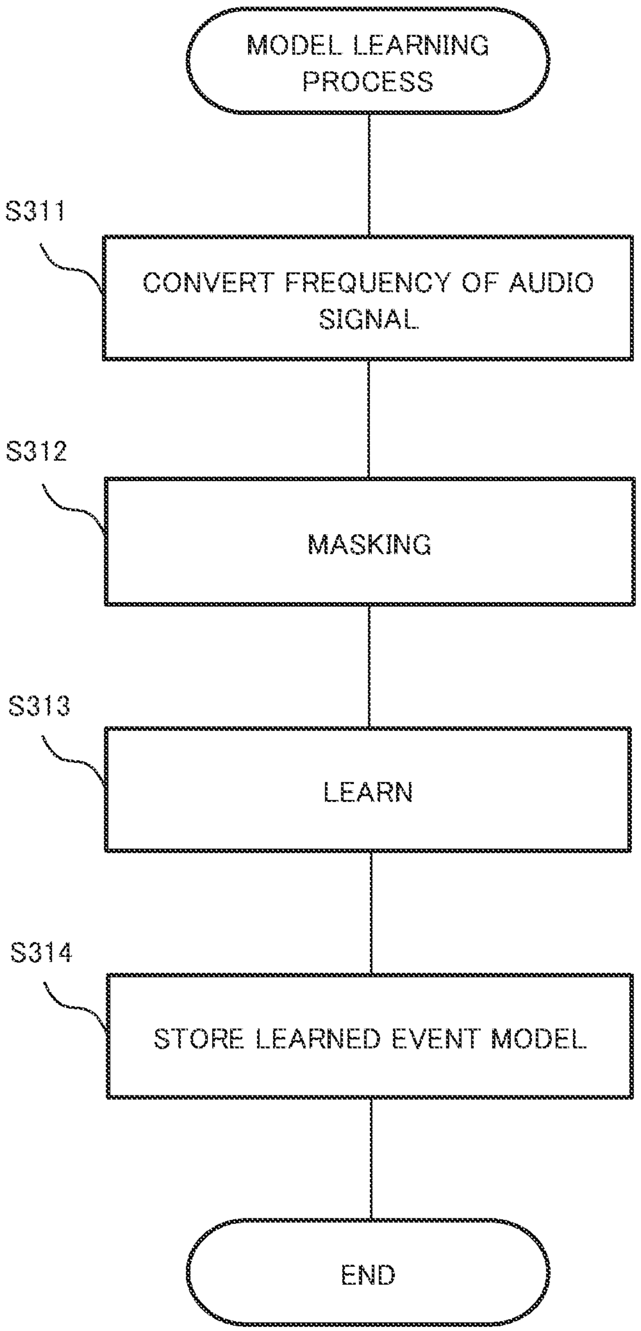
FIG. 13 is a flowchart illustrating a flow of an operation of the audio signal processing device according to the third example embodiment.

As illustrated in FIG. 13, first, the frequency conversion unit 10 of the audio signal processing device 2 receives an audio signal and an event label.

The frequency conversion unit 10 converts the received audio signal into a frequency domain signal. Moreover, the frequency conversion unit 10 projects a spectrogram by a nonlinear function so as to emphasize a domain in which power is strong in the generated spectrogram (S311).

Thereafter, the frequency conversion unit 10 transmits the (projected) spectrogram to the masking unit 20 together with the event label.

The masking unit 20 receives the spectrogram and the event label from the frequency conversion unit 10. The masking unit 20 receives an event mask used to detect an audio event to be detected from the binarization unit 22 of the mask generation device 120 (FIG. 1) or the binarization unit 222 of the mask generation device 220 (FIG. 9). The masking unit 20 executes the masking process on the spectrogram using the received event mask (S312).

Specifically, the masking unit 20 multiplies the event mask illustrated in FIG. 2 with respect to the spectrogram. As a result, the masking unit 20 maintains intensities (power) of all frequency components of a spectrogram in a time period in which the value of the event mask is one (1.0) and converts the intensities (power) of all the frequency components of the spectrogram in the time period in which the value of the event mask is zero (0) into zero (0). The masking unit 20 transmits the spectrogram on which the masking process has been executed in this way to the learning unit 30 together with the event label.

The learning unit 30 receives the spectrogram on which the masking process has been executed and the event label from the masking unit 20. The learning unit 30 extracts an acoustic feature from the spectrogram on which the masking process has been executed.

When one input signal is input, the learning unit 30 makes the event model learn an acoustic feature of a spectrogram based on a large number of audio signals for learning so that the event model can output a correct detection result of the audio event (S313).

After learning of the event model is completed, the learning unit 30 stores the learned event model associated with the event label in the event model database 50 (S314).

Thus, the operation of the audio signal processing device 2 ends.

(Event Detection Process)

Another operation of the audio signal processing device 2 according to the present third example embodiment will be described with reference to FIG. 14. FIG. 14 is a flowchart illustrating a flow of an event detection process executed by each unit of the audio signal processing device 2.

Figure 14:
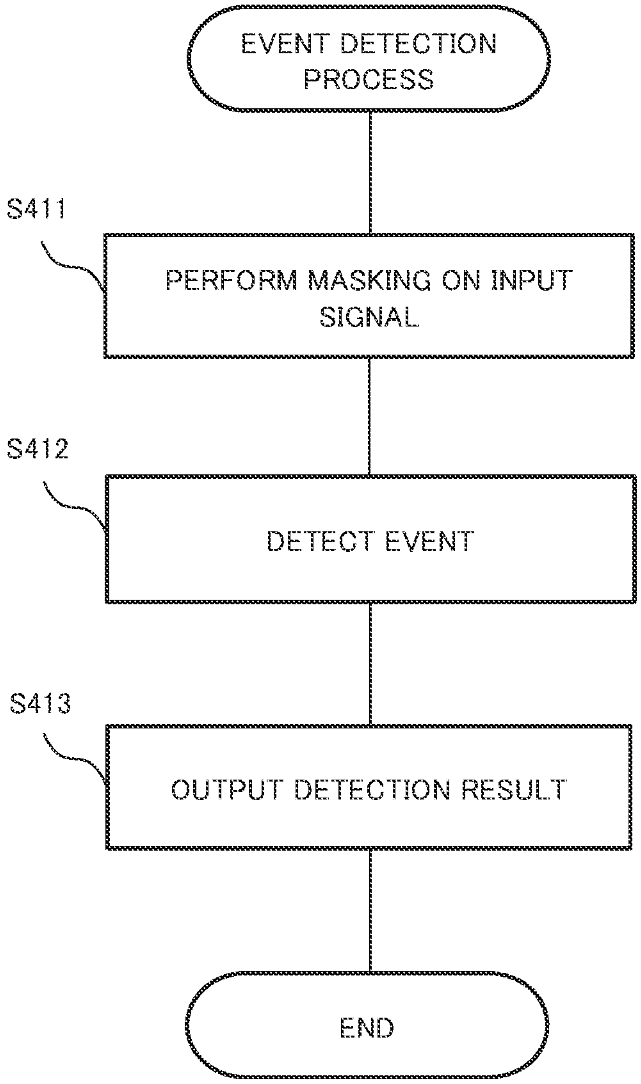
FIG. 14 is a flowchart illustrating a flow of another operation of the audio signal processing device according to the third example embodiment.

As illustrated in FIG. 14, first, the masking unit 20 of the audio signal processing device 2 receives an input signal for event detection. Here, the input signal is a spectrogram obtained by converting an audio signal into the frequency domain signal. Thereafter, the masking unit 20 executes the masking process on the input signal (that is, spectrogram) using the event mask used to detect an audio event to be detected (S411).

Specifically, regarding the input signal, the masking unit 20 maintains power of an input signal in a time period in which a value of the associated event mask is one (1.0) and converts power of an input signal in a time period in which the value of the associated event mask is zero (0) into zero (0). The masking unit 20 transmits the input signal on which the masking process has been executed to the detection unit 40.

The detection unit 40 receives the input signal on which the masking process has been executed from the masking unit 20. The detection unit 40 detects an audio event from the input signal on which the masking process has been executed using the learned event model stored in the event model database 50 (S412).

More specifically, the detection unit 40 inputs the input signal into the learned event model and receives a detection result of the audio event output from the learned event model. The detection result of the audio event includes at least information indicating the detected audio event and information indicating a time period in which the audio event exists.

Thereafter, the detection unit 40 can output a detection result of the audio event (S413).

Thus, the operation of the audio signal processing device 2 ends.

Effects of Present Example Embodiment

According to the configuration of the present example embodiment, the masking unit 20 executes the masking process on the input signal. The detection unit 40 detects the audio event from the input signal on which the masking process has been executed. Thereafter, the detection unit 40 outputs the detection result of the audio event. Therefore, the audio signal processing device 2 can detect a sound of which a spectrum shape is unknown as an audio event using the learned event model.

Fourth Example Embodiment

Figure 15:
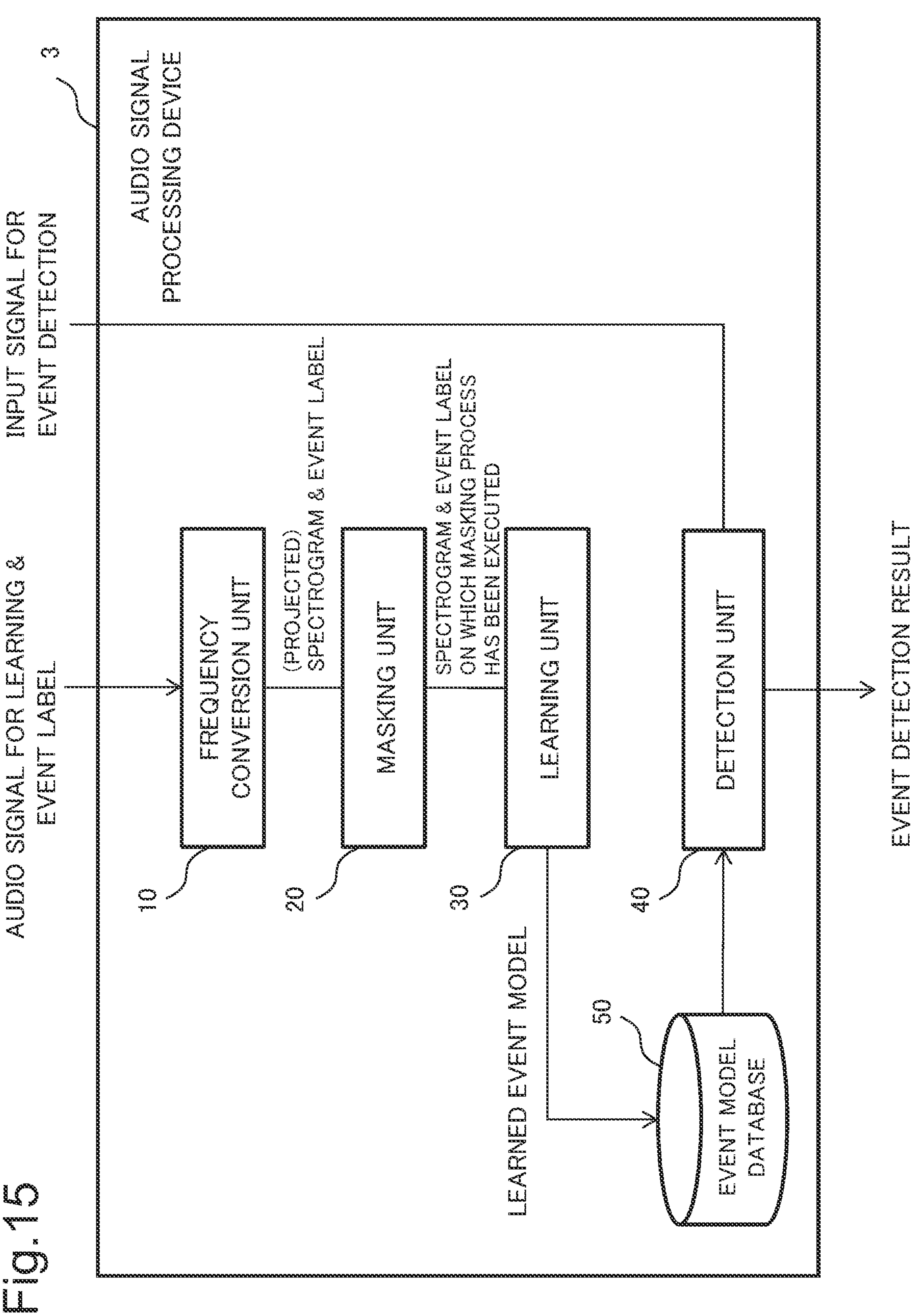
FIG. 15 is a block diagram illustrating a configuration of an audio signal processing device according to a fourth example embodiment.

A fourth example embodiment will be described with reference to FIGS. 15 and 16. In the present fourth example embodiment, a configuration will be described in which information indicating a time period in which an audio event exists is given to an event label using an event mask. In the first and third example embodiments, the event mask has been used to execute the masking process on the spectrogram by the audio signal processing device 1 to be described later. On the other hand, in the present fourth example embodiment, an event mask is applied to an event label having a specific property (weak label to be described later).

(Audio Signal Processing Device 3)

An audio signal processing device 3 according to the present fourth example embodiment will be described with reference to FIG. 15. FIG. 15 is a block diagram illustrating a configuration of the audio signal processing device 3. As illustrated in FIG. 15, the audio signal processing device 3 includes a frequency conversion unit 10, a masking unit 20, a learning unit 30, a detection unit 40, and an event model database 50.

The configuration of the audio signal processing device 3 according to the present fourth example embodiment is the same as the configuration of the audio signal processing device 2 according to the third example embodiment. However, an operation of the audio signal processing device 3 according to the present fourth example embodiment is partially different from the audio signal processing device 2. This will be described in detail below.

(Model Learning Process)

An operation of the audio signal processing device 3 according to the present fourth example embodiment will be described with reference to FIG. 16. FIG. 16 is a sequence diagram illustrating a flow of a process executed by each unit of the audio signal processing device 3. The operation of the audio signal processing device 3 according to the present fourth example embodiment is different from the operation of the audio signal processing device 2 according to the third example embodiment only in a process indicated in step S3312 in FIG. 16.

First, the frequency conversion unit 10 of the audio signal processing device 3 receives an audio signal and an event label.

Figure 16:
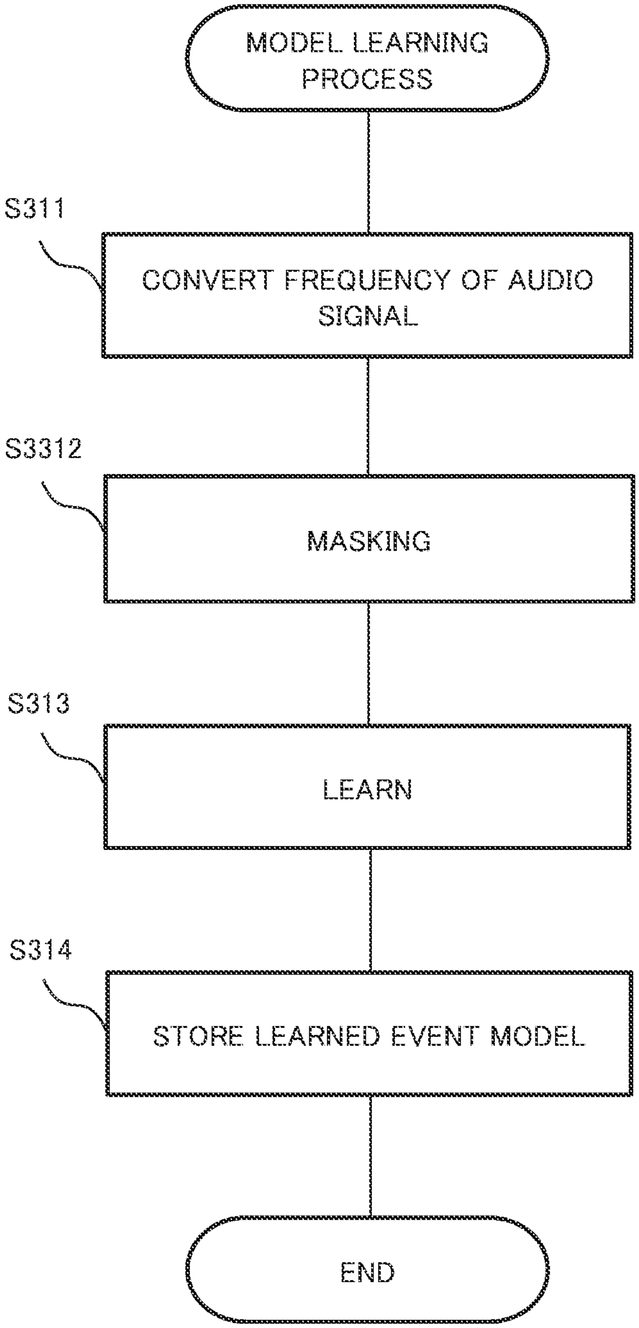
FIG. 16 is a flowchart illustrating a flow of an operation of the audio signal processing device according to the fourth example embodiment.

As illustrated in FIG. 16, the frequency conversion unit 10 converts the received audio signal into a frequency domain signal (S311). Moreover, the frequency conversion unit 10 projects a spectrogram by a nonlinear function so as to emphasize a domain in which power is strong in the generated spectrogram. In the following description, the spectrogram indicates a projected spectrogram.

Thereafter, the frequency conversion unit 10 transmits the (projected) spectrogram to the masking unit 20 together with the event label. The event label according to the present fourth example embodiment includes only information indicating an audio event and does not include information used to specify a time period in which the audio event exists.

Time information indicating that an audio event to be detected constantly exists is given to an initial event label according to the fourth example embodiment. For example, the time information of the event label represents a temporal change in whether the audio event exists. In the present fourth example embodiment, such an initial event label is defined as a weak label. For example, time information of a weak label includes only a value one (1.0) in the entire time period.

The masking unit 20 receives the spectrogram and the weak label from the frequency conversion unit 10. The masking unit 20 receives the event mask according to the audio event to be detected from the binarization unit 22 of the mask generation device 120 (FIG. 1) or the binarization unit 222 of the mask generation device 220 (FIG. 9). As described in the first example embodiment, the event mask is the time function that takes the value of one (1.0) in the time period in which the audio event exists, and takes the value of zero (0) in the time period in which the audio event does not exist.

The masking unit 20 executes the masking process on the time information held by the weak label received from the frequency conversion unit 10 using the event mask (S3312).

Specifically, the masking unit 20 multiplies the event mask illustrated in FIG. 2 with respect to the time information held by the weak label. By multiplying the event mask with respect to the time information held by the weak label, the time information indicating the time period in which the audio event to be detected exists is given to the weak label. After the masking process, the masking unit 20 transmits the spectrogram received from the frequency conversion unit 10 to the learning unit 30 together with the masking-processed weak label (described as event label on which masking process has been executed in FIG. 15).

The learning unit 30 receives the spectrogram and the event label on which the masking process has been executed from the masking unit 20. The learning unit 30 generates an acoustic feature of the spectrogram. When one input signal is input, the learning unit 30 makes the event model learn the acoustic feature generated from the spectrogram based on a large number of audio signals for learning together with the time information held by the masking-processed event label so that the event model can output a correct detection result of the audio event (S313).

After learning of the event model is completed, the learning unit 30 stores the learned event model associated with the masking-processed event label in the event model database 50 (S314).

Thus, the operation of the audio signal processing device 3 ends. In this way, the audio signal processing device 3 according to the present fourth example embodiment can efficiently generate the learned event model by making the event model perform learning using the time information indicating the time period in which the audio event to be detected exists together with the spectrogram.

(Event Detection Process)

In an event detection process according to the present fourth example embodiment, the masking process is not executed as in the first to third example embodiments. In the event detection process according to the present fourth example embodiment, the detection unit 40 detects an audio event using a learned event model. Thus, the operation of the audio signal processing device 3 ends.

Effects of Present Example Embodiment

According to the configuration of the present example embodiment, the masking unit 20 applies the event mask to the weak label that does not have the time information indicating the time period in which the audio event to be detected exists. As a result, the time information indicating the time period in which the audio event exists is given to the weak label.

The detection unit 40 detects the audio event from the input signal using the learned event model and the time information. Thereafter, the detection unit 40 outputs the detection result of the audio event. The audio signal processing device 3 can detect a sound of which a spectrum shape is unknown as an audio event using the learned event model.

While the invention has been particularly shown and described with reference to exemplary embodiments thereof, the invention is not limited to these embodiments. That is, it will be understood by those of ordinary skill in the art that various modes may be applied therein without departing from the spirit and scope of the present invention as defined by the claims.

INDUSTRIAL APPLICABILITY

The present invention can be used to monitor behaviors of people indoors or in town or to determine whether a machine normally operates.

REFERENCE SIGNS LIST

1 audio signal processing device
2 audio signal processing device
3 audio signal processing device
120 mask generation device
21 extraction unit

22 binarization unit
220 mask generation device
221 extraction unit
222 binarization unit
2221 preprocessing unit
2222 integration unit
2223 smoothing unit

What is claimed is:

1. A mask generation device comprising:

a memory storing a computer program; and at least one processor configured to run the computer program to execute to:

extract sound pressure information from a spectrogram; and generate an event mask indicating a time period in which an audio event exists by executing a binarization process on the extracted sound pressure information.

2. The mask generation device according to claim 1, wherein the at least one processor is configured to run the computer program to execute to:

extract at least a maximum value series of the spectrogram and an average value series of the spectrogram from the spectrogram as the sound pressure information.

3. The mask generation device according to claim 1, wherein the at least one processor is configured to run the computer program to execute to:

binarize an audio signal, integrate the binarized sound pressure information, and smooth the integrated sound pressure information.

4. A mask generation method comprising:

extracting sound pressure information from a spectrogram; and generating an event mask indicating a time period in which an audio event exists by executing a binarization process on the extracted sound pressure information.

5. The mask generation method according to claim 4, wherein the sound pressure information includes at least a maximum value series and an average value series of the spectrogram.

6. A non-transitory recording medium storing a program for causing a computer to execute:

extracting sound pressure information from a spectrogram; and generating an event mask indicating a time period in which an audio event exists by executing a binarization process on the extracted sound pressure information.

7. The non-transitory recording medium storing a program for causing a computer to execute according to claim 6, wherein the sound pressure information includes at least a maximum value series and an average value series of the spectrogram.

8. An audio signal processing device that detects an audio event from an input signal using the event mask generated by the mask generation device according to claim 1.

* * * * *